US009671957B2

(12) United States Patent
Jones et al.

(10) Patent No.: US 9,671,957 B2
(45) Date of Patent: *Jun. 6, 2017

(54) PRESERVING DATA AVAILABILITY AND I/O PERFORMANCE WHEN CREATING VIRTUAL RAID VOLUMES

(75) Inventors: Carl E. Jones, Tucson, AZ (US); Subhojit Roy, Pune (IN)

(73) Assignee: International Business Machines Corporation, Armonk, NY (US)

(*) Notice: Subject to any disclaimer, the term of this patent is extended or adjusted under 35 U.S.C. 154(b) by 816 days.

This patent is subject to a terminal disclaimer.

(21) Appl. No.: 13/459,217

(22) Filed: Apr. 29, 2012

(65) Prior Publication Data
US 2012/0331225 A1 Dec. 27, 2012

Related U.S. Application Data

(63) Continuation of application No. 13/170,165, filed on Jun. 27, 2011.

(51) Int. Cl.
*G06F 12/08* (2016.01)
*G06F 3/06* (2006.01)
*G06F 11/10* (2006.01)

(52) U.S. Cl.
CPC ........... *G06F 3/0605* (2013.01); *G06F 3/067* (2013.01); *G06F 3/0665* (2013.01); *G06F 3/0689* (2013.01); *G06F 11/1076* (2013.01)

(58) Field of Classification Search
CPC ...... G06F 3/0605; G06F 3/0665; G06F 3/067; G06F 3/0689; G06F 11/1076
USPC ............................................ 711/114, E12.016
See application file for complete search history.

(56) References Cited

U.S. PATENT DOCUMENTS

| 7,620,775 B1 * | 11/2009 | Waxman .................. 711/114 |
| 7,739,448 B1 * | 6/2010 | Oliveira et al. ............. 711/114 |
| 7,802,053 B2 | 9/2010 | Shiga |
| 7,802,063 B1 | 9/2010 | Chatterjee et al. |

(Continued)

FOREIGN PATENT DOCUMENTS

JP 2010086420 A2 4/2010

OTHER PUBLICATIONS

Warden, Tim, "Storage Virtualization—FAQ & Discussions," last retrieved at http://www.las-solanas.com/storage_virtualization_provisioning.php,. Nov. 17, 2006; updated Jul. 3, 2010.*

(Continued)

*Primary Examiner* — Reginald Bragdon
*Assistant Examiner* — Mehdi Namazi
(74) *Attorney, Agent, or Firm* — Nelson and Nelson; Daniel P. Nelson; Alexis V. Nelson

(57) ABSTRACT

A method for preserving data availability and I/O performance when creating a virtual RAID volume includes exposing a set of backend virtual volumes. The backend virtual volumes are implemented on a set of physical storage devices (e.g., physical disks or solid state drives) residing on a storage system. The method further enables selection of the set of backend virtual volumes to create a virtual RAID volume having a selected RAID level. The method further provides verification that the backend virtual volumes will be implemented on the physical storage devices in a way that preserves the data availability and I/O performance associated with the selected RAID level.

11 Claims, 9 Drawing Sheets

(56) References Cited

U.S. PATENT DOCUMENTS

| | | | |
|---|---|---|---|
| 2006/0294438 A1* | 12/2006 | Odawara et al. | 714/42 |
| 2008/0028243 A1* | 1/2008 | Morisawa | 713/323 |
| 2008/0126734 A1 | 5/2008 | Murase | |
| 2009/0313395 A1 | 12/2009 | Bolik et al. | |
| 2010/0023847 A1* | 1/2010 | Morita et al. | 714/801 |
| 2010/0299491 A1 | 11/2010 | Ueda | |
| 2012/0297243 A1* | 11/2012 | He et al. | 714/6.21 |
| 2012/0317355 A1* | 12/2012 | Ishizaki et al. | 711/114 |

OTHER PUBLICATIONS

IBM Corp., "Mechanism for Optimal Configuration of I/O Memory Entitlement," IP.com, No. IPCOM000179082D, Feb. 5, 2009.
Fujitsu Corp., "Virtualization of ETERNUS Disk-Array Subsystem," last retrieved at http://img.jp.fujitsu.com/downloads/jp/jmag/vol60-3/paper07.pdf, 2009.
Warden, Tim, Storage Virtualization—FAQs & Discussions, last retrieved at http://www.las-solanas.com/storage_virtualization/thin_provisioning.php, Nov. 17, 2006; updated Jul. 3, 2010.
Vanover, Rick, "Religious Issue #6: Thin Provisioning," last retrieved at http://virtualizationreview.com/Blogs/Everyday-Virtualization/List/Blog-List.aspx?Page=3, Sep. 2010.

* cited by examiner

PRESERVING DATA AVAILABILITY AND I/O PERFORMANCE WHEN CREATING VIRTUAL RAID VOLUMES

BACKGROUND

Field of the Invention

This invention relates to apparatus and methods for preserving data availability and I/O performance when creating virtual RAID volumes with storage virtualization products.

Background of the Invention

Storage virtualization software running on a host computer or in a storage-area-network (SAN) may be used to create virtual RAID volumes such as striped or mirrored volumes. Applications may use these virtual RAID volumes instead of accessing physical disks directly. I/O performance may be improved by striping data across multiple physical disks. Data availability may be improved by replicating data across multiple physical disks.

With the increasing popularity of thin provisioning, disk array vendors may expose virtual volumes (e.g., virtual logical unit numbers, or LUNs) that are thin provisioned. In such volumes, physical storage space is allocated on demand. That is, the total virtual space allocated to a thin-provisioned volume is not fully backed by physical storage space until an application writes to the volume, at which time space is allocated to hold the write data. On-demand allocation may be performed from a storage pool that consists of physical disks within the disk array.

Unfortunately, on-demand allocation of physical space inside storage arrays can cause problems for virtual RAID volumes created by storage virtualization products such as IBM's Logical Volume Manager (LVM), Veritas Volume Manager (VxVM), VMWare, IBM's SAN Volume Controller (SVC), or the like. For example, to improve I/O performance, SVC may be used to create a three-way striped virtual RAID volume from three thin-provisioned volumes exposed by a backend disk array. The disk array is unaware that the thin-provisioned volumes are used in the three-way striped virtual RAID volume. When writes occur to the three-way striped volume, the disk array allocates physical space to the three thin-provisioned volumes from a pool of physical disks. Since the disk array is unaware that the thin-provisioned volumes are used in a virtual RAID volume, the disk array may allocate physical storage to the three thin-provisioned volumes from the same physical disk. This will defeat the very purpose of creating the three-way striped volume on the SVC.

Similarly, if storage virtualization software were to create an n-way mirrored virtual RAID volume from n thin-provisioned volumes, it is possible that the disk array would allocate space to some or all of the n thin-provisioned volumes from a single backend physical disk, thereby reducing or eliminating the data availability characteristic that the n-way mirrored virtual RAID volume was intended to create. As stated above, this occurs because the backend disk array is unaware of the I/O performance and/or data availability characteristics associated with virtual RAID volumes exposed by higher layers of storage virtualization software. This can create significant problems in enterprise data centers where the I/O performance and data availability characteristics of a virtual RAID volume are critical to an application's requirements.

In view of the foregoing, what is needed are apparatus and methods to preserve data availability and I/O performance associated with particular RAID levels when creating virtual RAID volumes.

SUMMARY

The invention has been developed in response to the present state of the art and, in particular, in response to the problems and needs in the art that have not yet been fully solved by currently available apparatus and methods. Accordingly, the invention has been developed to provide apparatus and methods for preserving data availability and I/O performance characteristics when creating virtual RAID volumes. The features and advantages of the invention will become more fully apparent from the following description and appended claims, or may be learned by practice of the invention as set forth hereinafter.

Consistent with the foregoing, a method for preserving data availability and I/O performance when creating a virtual RAID volume is disclosed. In one embodiment, such a method includes exposing a set of backend virtual volumes. The backend virtual volumes are implemented on a set of physical storage devices (e.g., physical disks or solid state drives) residing on a storage system. The method further enables selection of the set of backend virtual volumes to create a virtual RAID volume having a selected RAID level. The method further provides verification that the backend virtual volumes will be implemented on the physical storage devices in a way that preserves the data availability and I/O performance associated with the selected RAID level. A corresponding computer program product and apparatus are also disclosed and claimed herein.

In another aspect of the invention, a method for preserving data availability and I/O performance when creating a virtual RAID volume includes selecting a RAID level for use with an application. The RAID level is selected to provide a desired level of data availability and I/O performance. The method further includes selecting a set of backend virtual volumes to create a virtual RAID volume in accordance with the selected RAID level. The backend virtual volumes are implemented on a set of physical storage devices residing on a storage system. The method further includes verifying that the backend virtual volumes will be implemented on the physical storage devices in a way that preserves the data availability and I/O performance associated with the RAID level.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
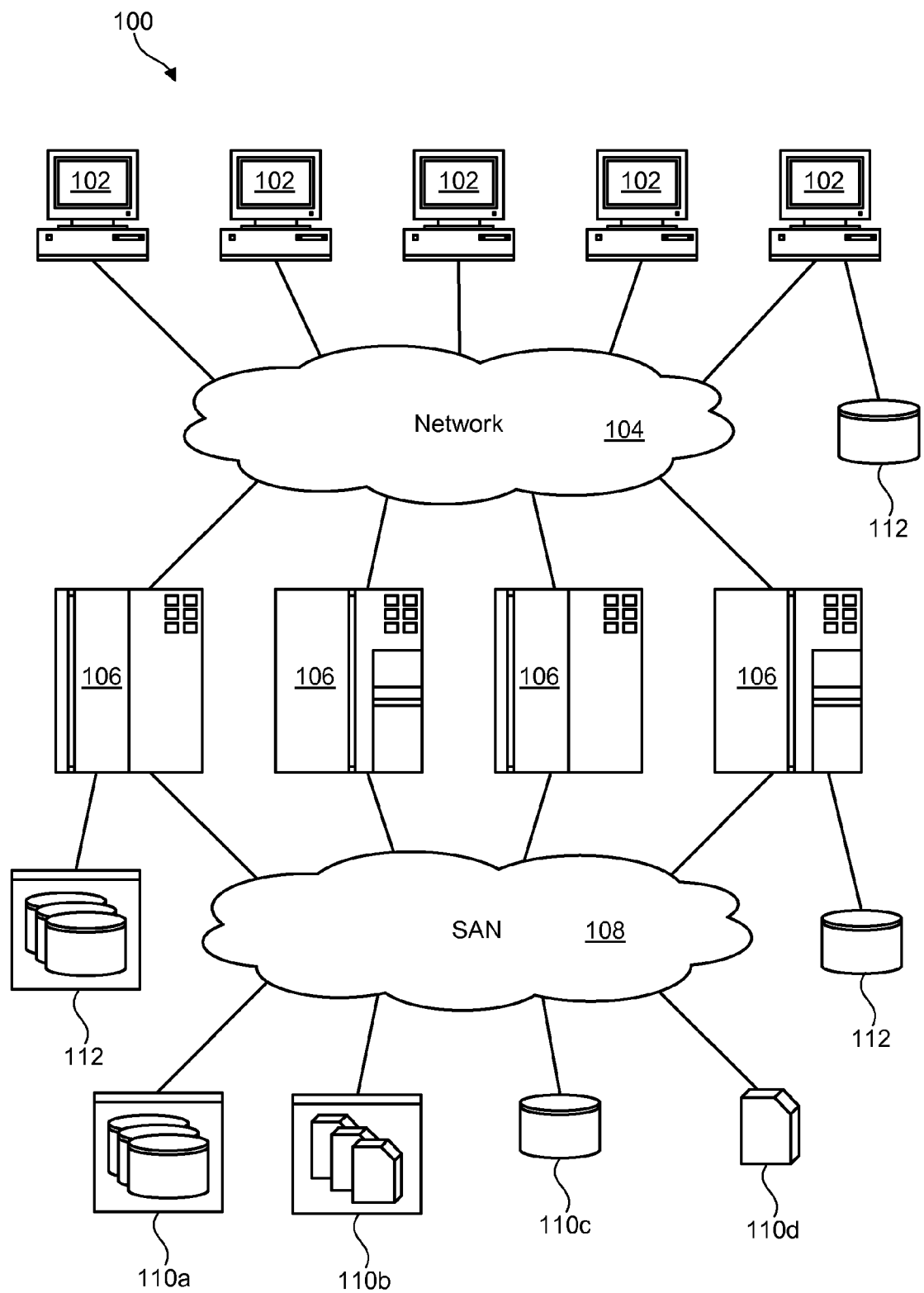
FIG. 1 is a high-level block diagram showing one example of a network architecture in which various embodiments of the invention might operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where various embodiments of the invention might operate. The network architecture 100 is presented only by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
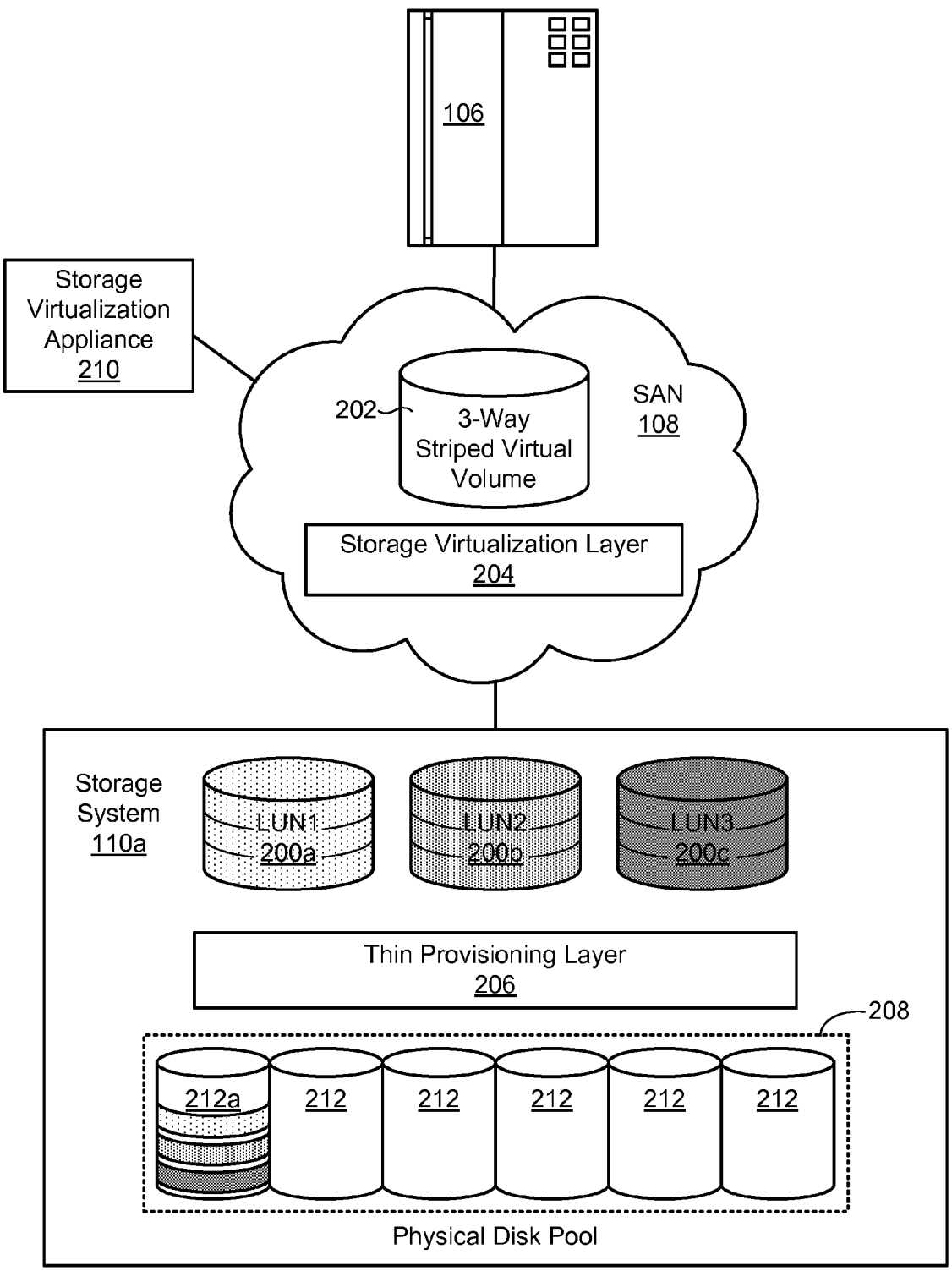
FIG. 2 is a high-level block diagram showing one example of a prior art storage system that allocates physical space to thin-provisioned volumes without preserving the data availability and I/O performance of the virtual RAID volume in which the thin-provisioned volumes are used.

Referring to FIG. 2, as previously mentioned, in many cases, backend storage systems 110 such as disk arrays 110a may be unaware of the I/O performance and data availability characteristics associated with virtual RAID volumes exposed by higher layers of storage virtualization software. FIG. 2 shows one example of a prior art storage system 110a that allocates physical space to thin-provisioned volumes 200a-c in a way that does not preserve the data availability and I/O performance of a virtual RAID volume 202 exposed by a higher layer of storage virtualization software. In the illustrated embodiment, the storage virtualization layer 204 is implemented by a SAN appliance 210 (e.g., IBM's SAN Volume Controller (SVC)) that sits in the data path between the host 106 and the storage system 110a.

In the illustrated example, assume that the storage virtualization layer 204 creates a virtual RAID volume 202 for use by an application running on the host 106. In this example, the virtual RAID volume 202 is a three-way striped virtual RAID volume 202, which uses three thin-provisioned volumes 200a-c exposed by the backend disk array 110a. The disk array 110a is unaware that the thin-provisioned volumes 200 are used in the three-way striped volume 202. When the host 106 writes to the three-way striped volume 202, a thin-provisioning layer 206 in the disk array 110a allocates physical space to the three thin-provisioned volumes 200a-c from a physical disk storage pool 208. Since the disk array 110a is unaware that the thin-provisioned volumes 200a-c are used in the three-way striped volume 202, the thin-provisioning layer 206 allocates physical storage to the three thin-provisioned volumes 200a-c from the same physical storage pool 208, possibly from the same physical disk 212.

For example, as shown in FIG. 2, space is undesirably allocated to each of the thin-provisioned volumes 200a-c from the same physical disk 212a. As understood by those of skill in the art, such a situation defeats the very purpose of creating the three-way striped virtual RAID volume 202, which is to increase I/O performance by spreading data across multiple physical disks 212. Thus, apparatus and methods are needed to preserve data availability and I/O performance when creating virtual RAID volumes 202 from backend virtual volumes 200, such as backend thin-provisioned volumes 200.

Figure 3:
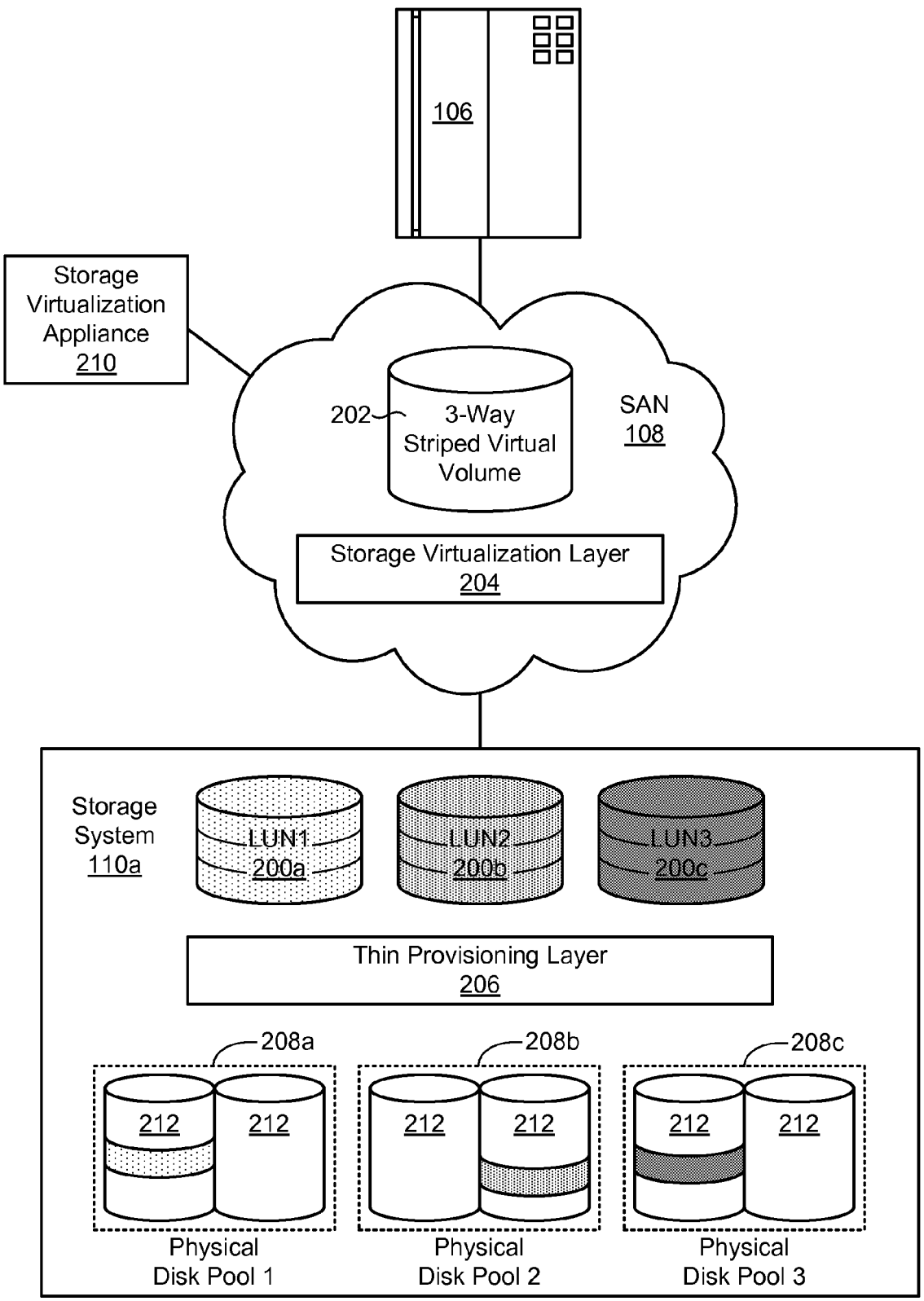
FIG. 3 is a high-level block diagram showing one example of a storage system that allocates physical space to thin-provisioned volumes while preserving the data availability and I/O performance of the virtual RAID volume in which the thin-provisioned volumes are used.

FIG. 3 shows one example of a storage system 110a in accordance with the invention that allocates physical space to thin-provisioned volumes 200a-c in a way that preserves data availability and I/O performance of virtual RAID volumes 202 created by higher layers of storage virtualization software. Like the previous example, the storage virtualization layer 204 is implemented by a SAN appliance 210, such as IBM's SVC, that sits in the data path between the host 106 and the storage system 110a. The storage virtualization layer 204 creates a three-way striped virtual RAID volume 202 like that illustrated in FIG. 2 from three thin-provisioned volumes 200a-c exposed by a backend disk array 110a. In this example, the thin-provisioning layer 206 allocates physical storage space to the thin-provisioned volumes 200 from three different storage pools 208a-c, ensuring that space is allocated to the thin-provisioned volumes 200 from different physical disks 212. For example, space may be allocated to a first thin-provisioned volume 200a from a first storage pool 208a, to a second thin-provisioned volume 200b from a second storage pool 208b, and to a third thin-provisioned volume 200c from a third storage pool 208c. This preserves the objective of the striped virtual volume 202 which is to increase I/O performance by spreading the data across multiple physical disks 212.

Various different approaches may be used to verify that data availability and I/O performance associated with a particular RAID level are preserved when creating a virtual RAID volume 202 from backend virtual volumes 200, such as thin-provisioned volumes 200. In one embodiment, the storage system 110a is configured to expose an application programming interface (API) to enable external storage virtualization products to set domain separation requirements for backend virtual volumes 200. For example, when creating a striped virtual RAID volume 202 from several backend thin-provisioned volumes 200, the storage virtualization product may use the API to direct the storage system 110a to allocate physical space to the thin-provisioned volumes from different physical disks 212 or pools 208 of physical disks 212 in order to preserve the data availability and I/O performance of the RAID level. For example, in response to such a request, the storage system 110a may allocate space to a first virtual volume 200a from a first physical disk pool 208a, to a second virtual volume 200b from a second physical disk pool 208b, and to a third virtual volume 200c from a third physical disk pool 208c. One example of such an approach is illustrated in FIG. 3.

Alternatively, the storage system 110a may expose, along with the thin-provisioned volumes 200, information designating which storage pools 208 are used to allocate space to the thin-provisioned volumes 200a-c. Higher level storage virtualization software 204 may use this information to select thin-provisioned volumes 200a-c that are provisioned from different physical disk pools 208 in order to create virtual RAID volumes 202 with the desired domain separation. This will ensure that the RAID level's data availability and I/O performance are preserved as much as possible.

In certain embodiments, physical disk pools 208 that are used to allocate space to different thin-provisioned volumes 200 may be discovered by way of a SCSI or other command sent to the storage system 110a. This may enable storage virtualization software to query the storage system 110a, which may in turn respond to the storage virtualization software, to determine which physical disk pools 208 are used to allocate space to selected thin-provisioned volumes 200. The storage virtualization software 204 may use the returned information to create virtual RAID volumes 202 from virtual volumes 200a-c with the desired domain separation.

Figure 4:
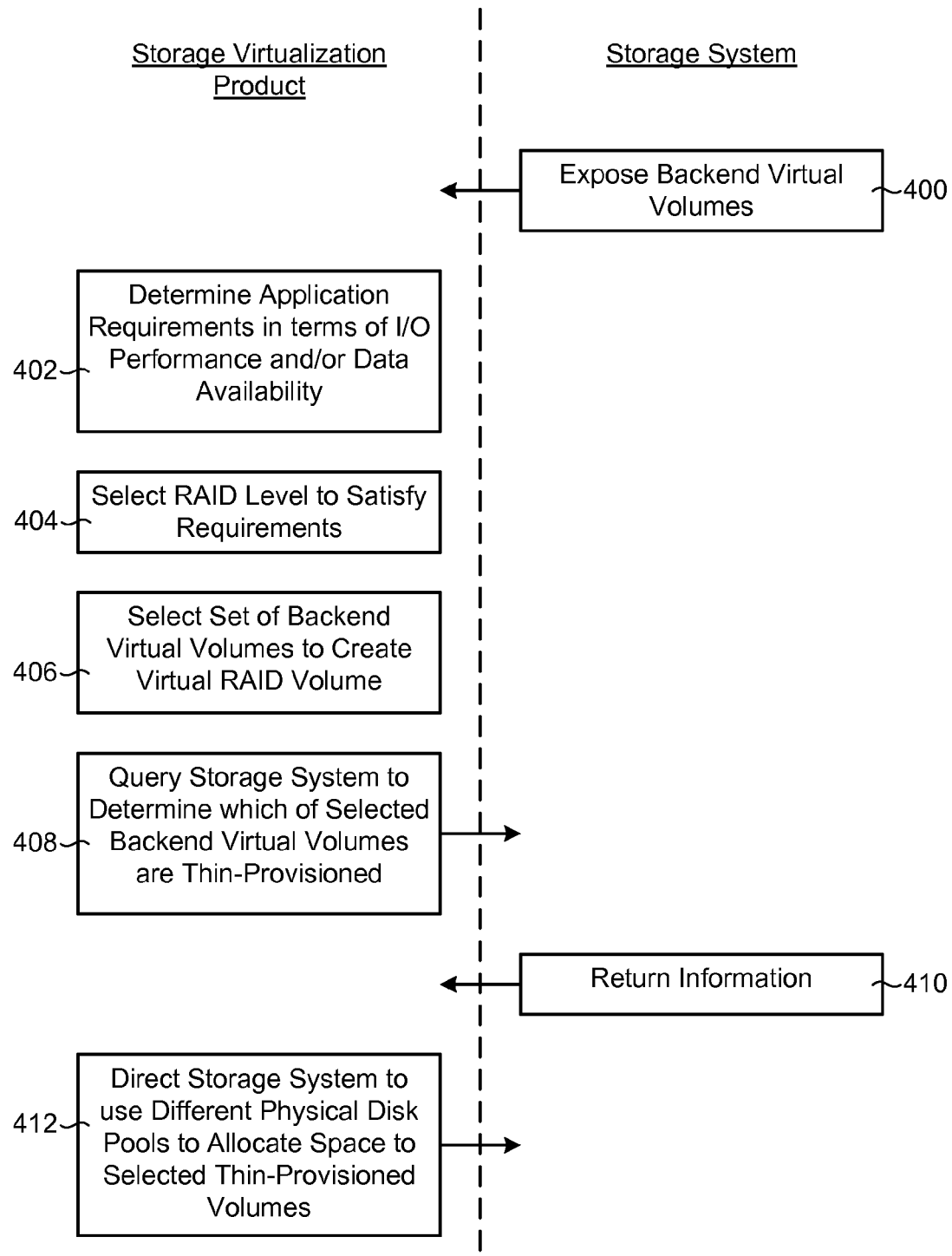
FIG. 4 shows one scenario for verifying that backend virtual volumes will be implemented on physical storage devices in a way that preserves the data availability and I/O performance associated with a virtual RAID volume.

FIG. 4 shows one example of a scenario for verifying that backend virtual volumes 200 will be implemented on physical storage devices 212 in a way that preserves data availability and I/O performance. As shown, a storage system 110a initially exposes 400 one or more backend virtual volumes 200 for use by connected systems. A storage virtualization product (e.g., SVC, LVM, VxVM, VMWare, etc.) determines 402 application requirements in terms of I/O performance and/or data availability. The storage virtualization product then selects 404 a RAID level, which may include striping and/or mirroring, to satisfy the application's requirements. The storage virtualization product then selects 406 a set of backend virtual volumes 200 to create a virtual RAID volume 202 having the selected RAID level.

Using the storage system API, the storage virtualization product queries 408 the storage system 110a to determine which of the selected backend virtual volumes 200 is thin-provisioned. The storage system 110a returns 410 information indicating which if any of the virtual volumes 200 is thin-provisioned. If any of the virtual volumes 200 are thin-provisioned, the storage virtualization product directs 412 the storage system 110a to use different physical disk pools 208 to allocate space to the selected thin-provisioned volumes 200.

Figure 5:
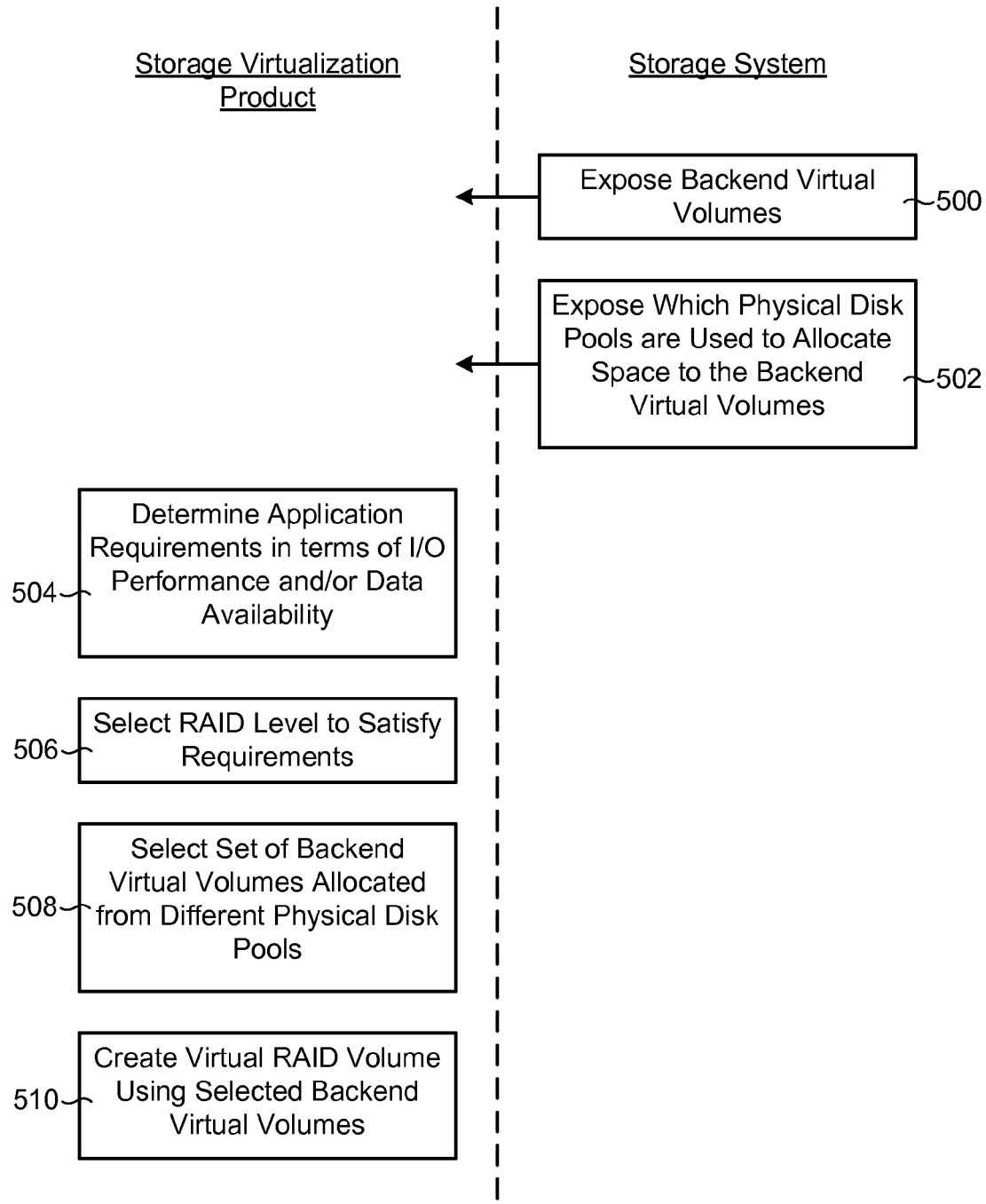
FIG. 5 shows another scenario for verifying that backend virtual volumes will be implemented on physical storage devices in a way that preserves the data availability and I/O performance associated with a virtual RAID volume.

FIG. 5 shows an alternative scenario for verifying that backend virtual volumes 200 will be implemented on physical storage devices 212 in a way that preserves data availability and I/O performance associated with a virtual RAID volume. As shown, a storage system 110a initially exposes 500 one or more backend virtual volumes 200 for use by connected systems. The storage system 110a also exposes 502 which physical disks 212 or disk pools 208 are used to allocate space to the virtual volumes 200. Meanwhile, a storage virtualization product determines 504 application requirements in terms of I/O performance and/or data availability. The storage virtualization product selects 506 a RAID level to satisfy the application's requirements. The storage virtualization product then selects 508 a set of backend virtual volumes 200. In doing so, the storage virtualization product uses information exposed by the storage system 110a to select backend virtual volumes 200 that are allocated from different physical disk pools 208. The storage virtualization product then creates 510 a virtual RAID volume 202 from the selected virtual volumes 200.

Figure 6:
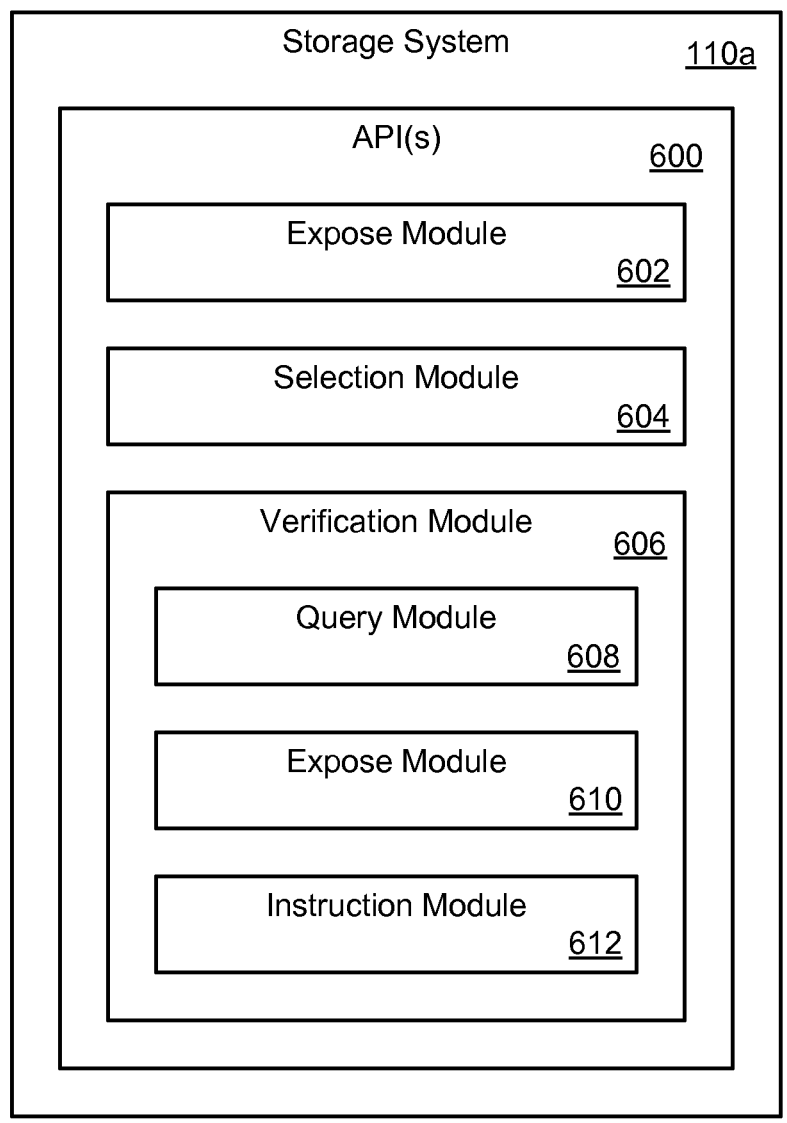
FIG. 6 shows various modules that may be included in a storage system API to preserve data availability and I/O performance associated with a virtual RAID volume.

Referring to FIG. 6, to ensure that data availability and I/O performance are preserved when creating virtual RAID volumes 202, a storage system 110a may be programmed or configured to include one or more modules. These modules may be implemented in hardware, software or firmware executable on hardware, or a combination thereof. These modules may be included in or work in conjunction with one or more APIs 600 of the storage system 110a. The modules are presented only by way of example and are not intended to be limiting. Indeed, alternative embodiments may include additional or fewer modules. The functionality of the modules may also be organized differently. For example, the functionality of some modules may be broken into multiple modules or, conversely, the functionality of several modules may be combined into a single module or fewer modules.

As illustrated in FIG. 6, in certain embodiments, the storage system 110a may include one or more of an expose module 602, a selection module 604, and a verification module 606. The expose module 602 may expose virtual volumes 200, such as thin-provisioned volumes 200, residing on the storage system 110a. This will allow the virtual volumes 200 to be seen by external systems such as storage virtualization products. In certain embodiments, the expose module 602 may also expose which physical disks 212 or disk pools 208 are used to allocate space to the virtual volumes 200. The selection module 604 may enable external systems to select one or more virtual volumes 200. For example, the selection module 604 may allow a storage virtualization product to select one or more virtual volumes 200 for inclusion in a virtual RAID volume 202.

The verification module 606 may enable an external system such as a storage virtualization product to verify that the data availability and I/O performance associated with a particular RAID level are preserved when creating a virtual RAID volume 202. For example, the verification module 606 may allow storage virtualization products to verify that two different thin-provisioned volumes 200 are allocated from different physical disks 212 or disk pools 208. As previously mentioned, various different approaches may be used to provide this verification. In certain embodiments, the verification module 606 includes one or more of a query module 608, an advertisement module 610, and an instruction module 612 to provide such verification.

The query module 608 may be configured to respond to queries, from external systems such as storage virtualization products, regarding domain separation. For example, the query module 608 may respond to queries requesting information about the physical disks 212 or disk pools 208 that are used to allocate space to thin-provisioned volumes 200. This may allow storage virtualization software to create virtual RAID volumes 202 from thin-provisioned volumes 200 that are allocated from different physical disks 212 or disk pools 208. In certain embodiments, the queries are received in the form of special (e.g., vendor-unique) SCSI commands. The storage system 110a may respond to these commands by returning the physical disk IDs or disk pool IDs associated with the virtual volumes 200 for which the queries were sent.

An expose module 610 may expose information designating which physical disks 212 or storage pools 208 are used to allocate space to exposed virtual volumes 200. In certain embodiments, this information is exposed without the need to query the storage system 110a. Higher level storage virtualization software may use this exposed information to select suitable virtual volumes 200 for creating virtual RAID volumes 202.

An instruction module 612 may receive and execute instructions from external systems such as storage virtualization software. For example, when creating a virtual RAID volume 202 from several virtual volumes 200, storage virtualization software may instruct the storage system 110a to allocate space to the virtual volumes 200 from different physical disks 212 or disk pools 208 in order to preserve data availability and I/O performance. The storage system 110a may respond to such requests and allocate space in the instructed manner. In certain embodiments, the instructions are received in the form of special SCSI commands which are then executed by the storage system 110a.

Figure 7:
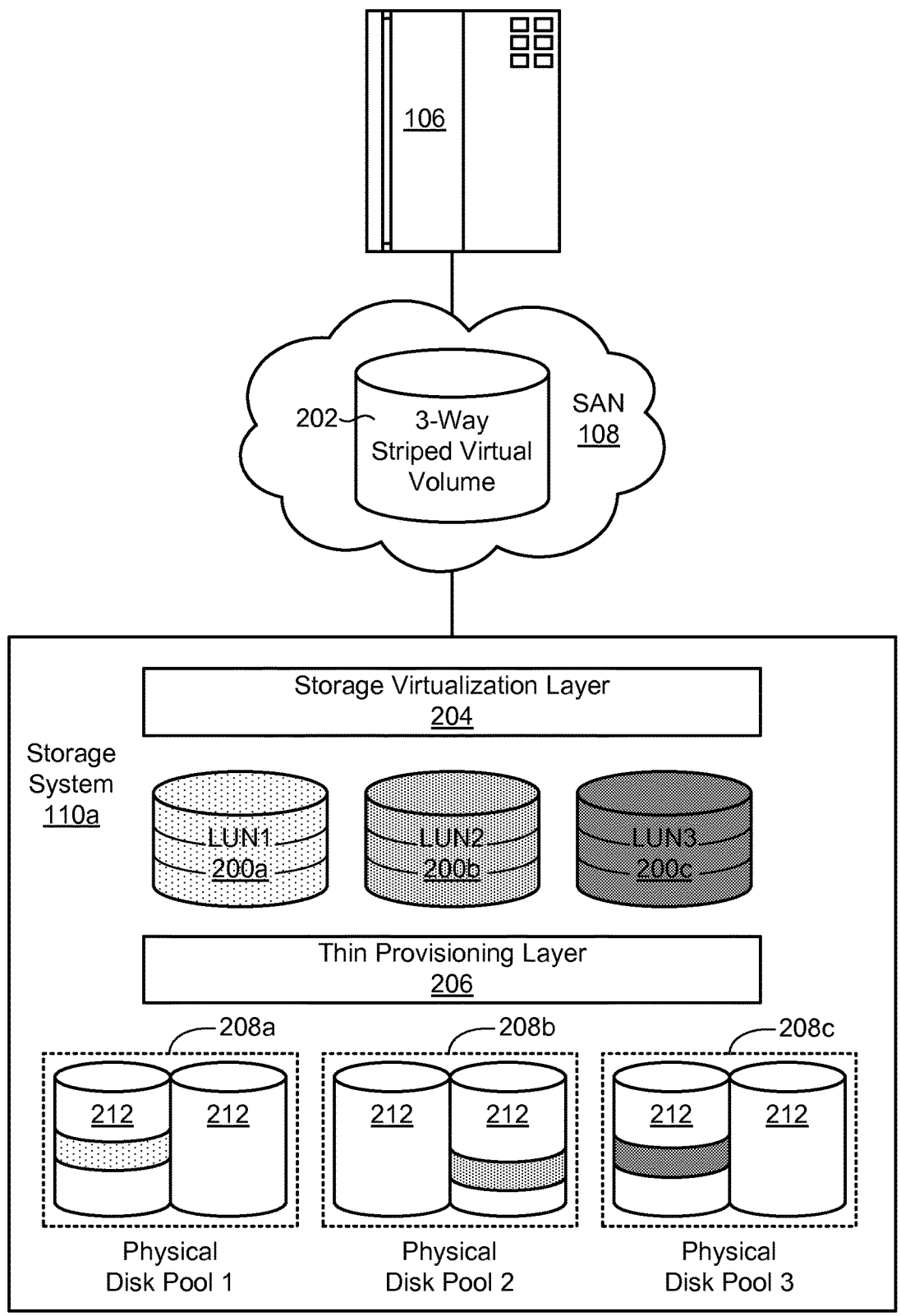
FIG. 7 is a high-level block diagram showing an alternative embodiment where the storage virtualization and thin-provisioning layers are contained in the same storage system.
Figure 8:
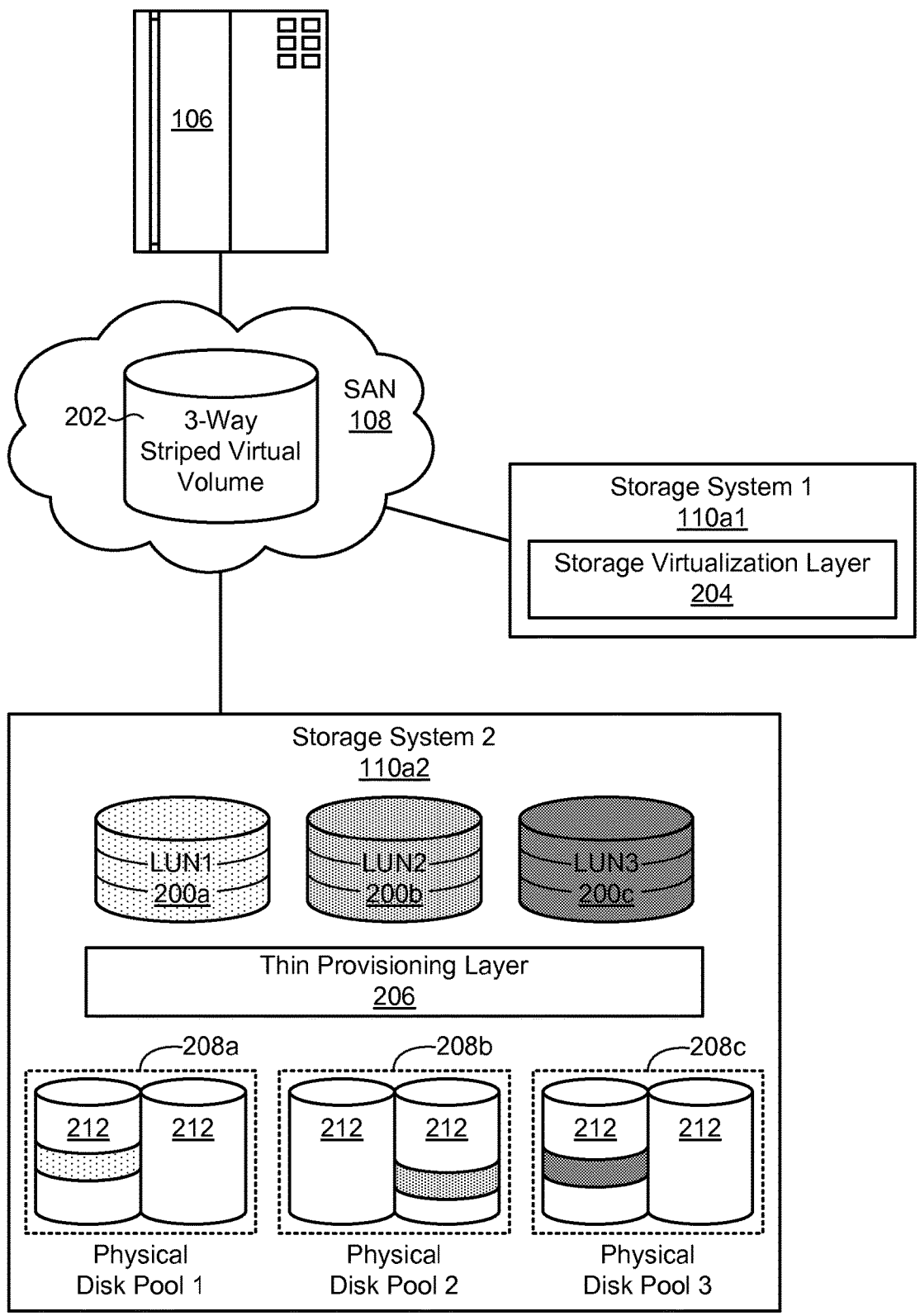
FIG. 8 is a high-level block diagram showing an alternative embodiment where the storage virtualization and thin-provisioning layers are contained in different storage systems.
Figure 9:
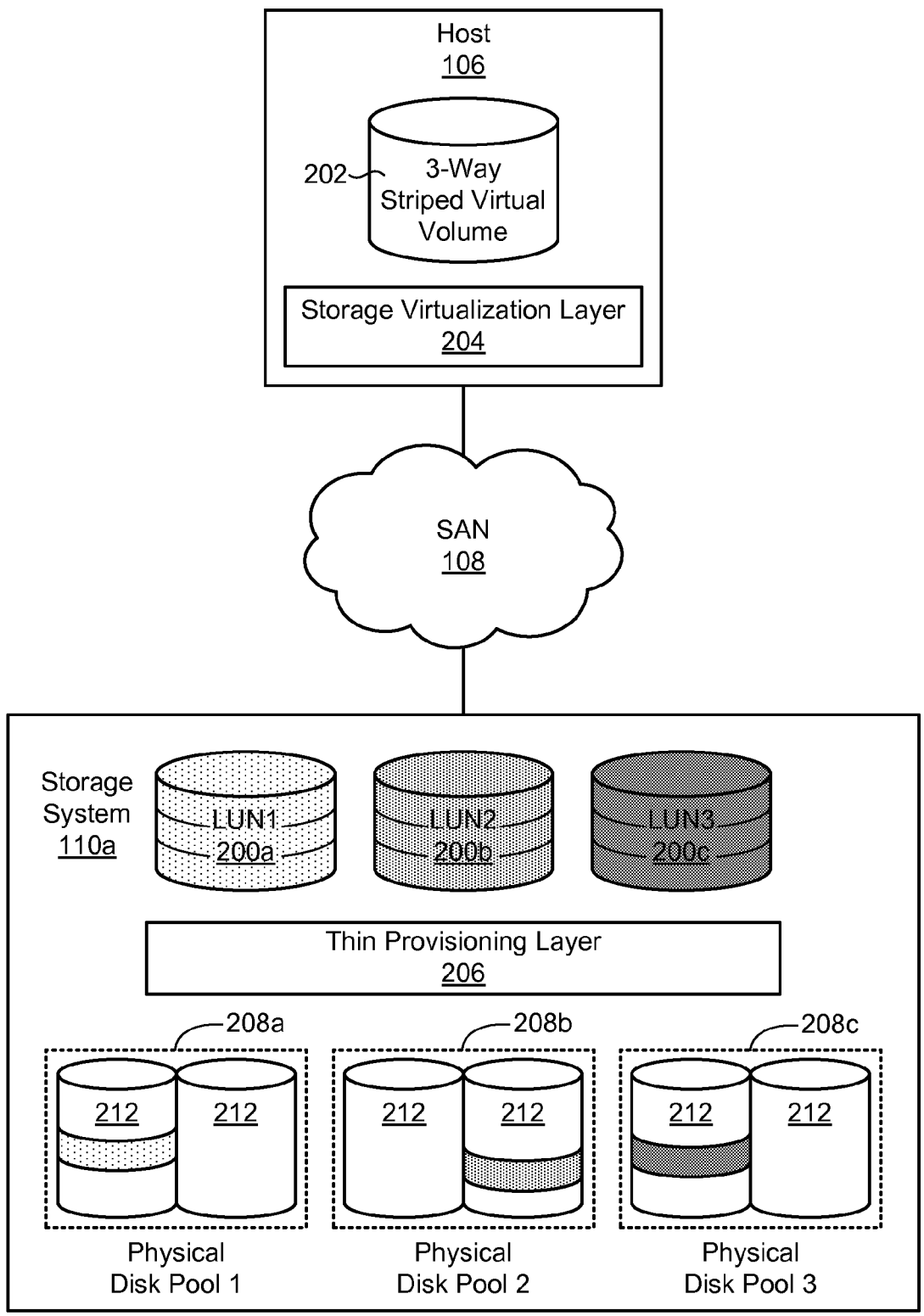
FIG. 9 is a high-level block diagram showing an alternative embodiment where the storage virtualization layer is contained in a host system and the thin-provisioning layer is contained in a storage system.

Referring to FIGS. 7 through 9, the apparatus and methods disclosed herein may allow storage virtualization software 204 to co-exist at various levels, such as at the host system 106, storage network 108, and storage system 110 levels. This is significant since storage virtualization at each level may have different sets of advantages and disadvantages.

FIG. 7 shows one embodiment a storage virtualization layer 204 that exists in a storage system controller 110. In such an embodiment, the storage virtualization layer 204 may create virtual RAID volumes 202 from virtual volumes 200, such as thin-provisioned volumes 200, in the storage system 110. FIG. 8 is similar to FIG. 7 except that the storage virtualization layer 204 resides in a first storage system 110a1 that directs I/O to a second storage system 110a2. In this approach, the first storage system 110a1 intercepts and redirects I/O requests to the external storage 110a2 as it does for internal storage. The storage virtualization layer 204 in the first storage system 110a1 creates virtual RAID volumes 202 using one or more virtual volume 200, such as thin-provisioned volumes 200, in the second storage system 110a2.

FIG. 9 shows an embodiment where the storage virtualization layer 204 is located in a host system 106. Using one or more backend virtual volumes 200 exposed by a storage system 110a, the storage virtualization layer 204 creates virtual RAID volumes 202 for applications running on the host system 106 or other host systems 106. Regardless of the location of the storage virtualization layer 204 or layers 204, the approaches disclosed herein enable higher layers of storage virtualization software to determine and/or control the manner in which physical space is allocated to underlying virtual volumes 200, thereby allowing storage virtualization software to preserve I/O performance and data availability associated with selected RAID levels.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for preserving data availability and I/O performance when creating a virtual RAID volume, the method comprising:
    exposing a set of backend virtual volumes, wherein the backend virtual volumes are implemented on a set of physical storage devices residing on a storage system;
    enabling selection of the set of backend virtual volumes to create a virtual RAID volume having a selected RAID level; and
    providing verification that the backend virtual volumes will be implemented on the physical storage devices in a way that preserves data availability and I/O performance associated with the selected RAID level.

2. The method of claim 1, wherein the backend virtual volumes are thin-provisioned volumes.

3. The method of claim 2, wherein providing verification comprises providing verification that space will be allocated to the thin-provisioned volumes in a way that preserves the data availability and I/O performance associated with the selected RAID level.

4. The method of claim 3, wherein providing verification comprises providing verification that space will be allocated to the thin-provisioned volumes from different physical storage devices.

5. The method of claim 1, wherein providing verification comprises enabling a storage virtualization product to query the storage system to determine how the backend virtual volumes are implemented on the set of physical storage devices.

6. The method of claim 1, wherein providing verification comprises exposing how the backend virtual volumes are implemented on the set of physical storage devices.

7. The method of claim 1, wherein providing verification comprises enabling a storage virtualization product to instruct the storage system to implement the backend virtual volumes on the physical storage devices in a way that preserves the data availability and I/O performance associated with the selected RAID level.

8. The method of claim 1, wherein the physical storage devices comprise at least one of disk drives and solid state drives.

9. The method of claim 1, wherein creating a virtual RAID volume comprises creating a virtual RAID volume that stripes data across the set of backend virtual volumes, and providing verification comprises providing verification that the data is striped across the set of physical storage devices in a way that preserves the data availability and I/O performance associated with the selected RAID level.

10. The method of claim 1, wherein creating a virtual RAID volume comprises creating a virtual RAID volume that mirrors data across the set of backend virtual volumes, and providing verification comprises providing verification that the data is mirrored across the set of physical storage devices in a way that preserves the data availability and I/O performance associated with the RAID level.

11. A method for preserving data availability and I/O performance when implementing a virtual RAID volume, the method comprising:
    selecting a RAID level for use with an application, wherein the RAID level is selected to provide a desired level of data availability and I/O performance;
    selecting a set of backend virtual volumes to create a virtual RAID volume having the selected RAID level, wherein the backend virtual volumes are implemented on a set of physical storage devices residing on a storage system; and
    verifying that the backend virtual volumes will be implemented on the physical storage devices in a way that preserves the data availability and I/O performance associated with the RAID level.

* * * * *